(12) United States Patent
Ripley

(10) Patent No.: US 6,754,568 B1
(45) Date of Patent: Jun. 22, 2004

(54) BRAKE RESPONSE ANALYSIS SYSTEM

(75) Inventor: John V. Ripley, Elyria, OH (US)

(73) Assignee: Bendix Commercial Vehicle Systems LLC

( * ) Notice: Subject to any disclaimer, the term of this patent is extended or adjusted under 35 U.S.C. 154(b) by 409 days.

(21) Appl. No.: 09/810,055

(22) Filed: Mar. 16, 2001

(51) Int. Cl.[7] .................................................. G01M 17/00
(52) U.S. Cl. ........................... 701/29; 701/70; 701/71; 340/453; 73/121
(58) Field of Search .......................... 701/29, 30, 31, 701/37, 43, 70, 71, 78, 80, 81, 83; 73/121, 122, 123; 340/453, 454

(56) References Cited

U.S. PATENT DOCUMENTS

| | | |
|---|---|---|
| 3,651,690 A | 3/1972 | Pagdin et al. |
| 4,520,663 A | 6/1985 | Moore et al. |
| 4,893,242 A | 1/1990 | Rogers et al. |
| 5,207,095 A | 5/1993 | Teare et al. |
| 5,239,486 A | 8/1993 | Mortier |
| 5,305,636 A | 4/1994 | Balsarotti et al. |
| 5,339,069 A | 8/1994 | Penner et al. |
| 5,474,154 A | 12/1995 | Coale |
| 5,681,992 A * | 10/1997 | Klein et al. .................. 73/121 |
| 5,689,231 A | 11/1997 | Olson |
| 5,791,441 A | 8/1998 | Matos et al. |
| 5,825,287 A | 10/1998 | Zarybnicky, Sr. et al. |
| 5,892,437 A | 4/1999 | Scheibe et al. |
| 5,979,230 A | 11/1999 | Balsarotti |
| 6,332,354 B1 * | 12/2001 | Lalor et al. .................. 73/121 |

* cited by examiner

Primary Examiner—Marthe Y. Marc-Coleman
(74) Attorney, Agent, or Firm—Calfee, Halter & Griswold LLP

(57) ABSTRACT

A system and a method which measure and record brake pressure data representing the brake application and release timing of service brake systems and the brake application timing of parking brake systems. The brake pressure data are used to determine if a specific vehicle or item of motor vehicle equipment meets the minimum performance requirements of FMVSS 121. As a result, compliance with the service brake and parking brake timing with the parameters set forth in FMVSS 121 may be verified, and other brake system diagnostic tests may be performed.

23 Claims, 15 Drawing Sheets

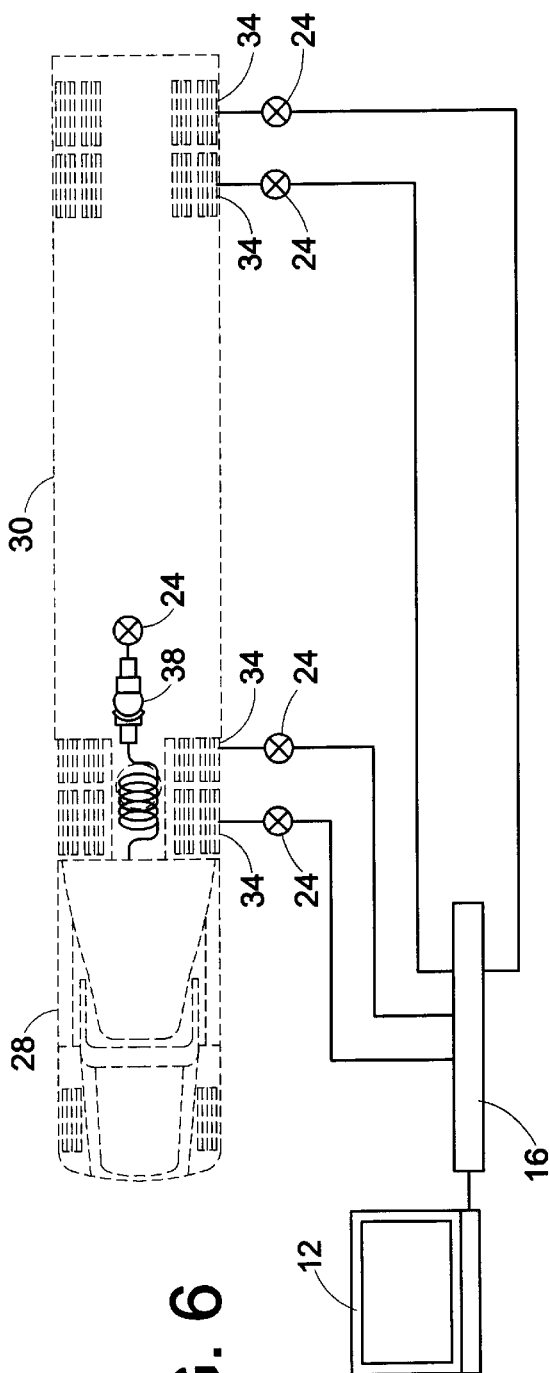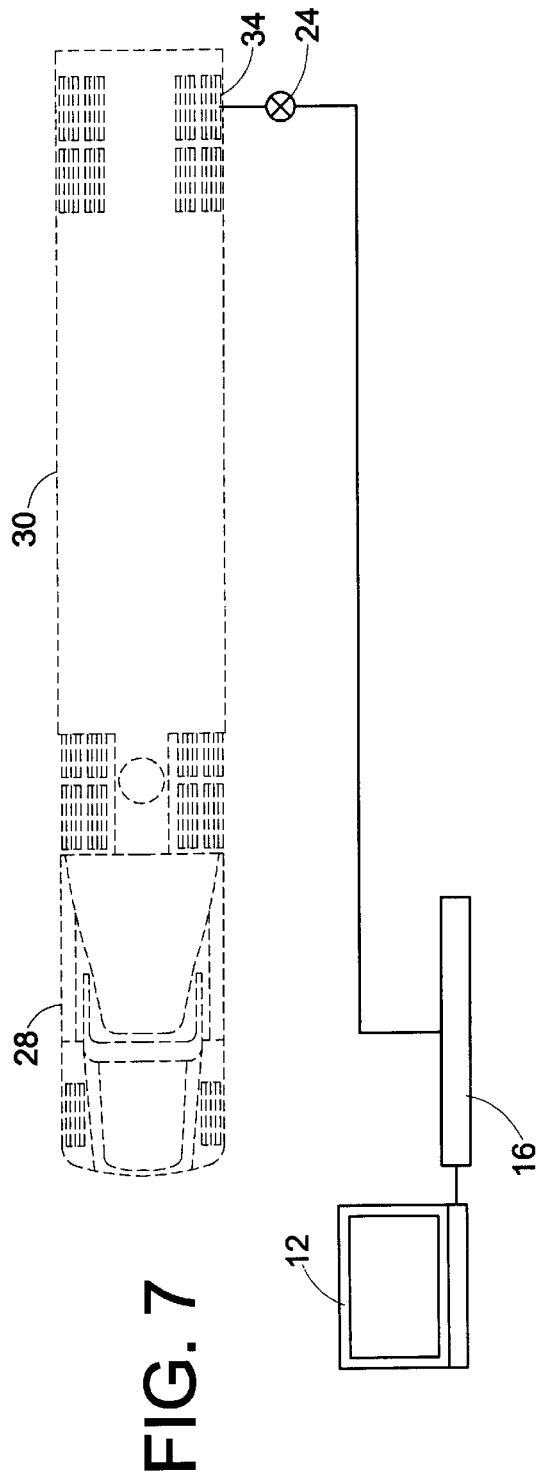

BRAKE RESPONSE ANALYSIS SYSTEM

FIELD OF THE INVENTION

The invention relates in general to a system which evaluates air braked vehicles for verification of compliance with motor vehicle safety standards. More specifically, the system evaluates and tests service brake actuation and release timing, parking brake application timing, and performs general brake system troubleshooting.

BACKGROUND OF THE INVENTION

Federal Motor Vehicle Safety Standard 121 (FMVSS 121) sets forth minimum braking system performance parameters with which all heavy duty vehicles such as straight trucks, buses, and combination vehicles including tractor-trailers, doubles, triples, and straight trucks with trailers must comply. Heavy duty vehicles typically utilize two separate braking systems: a service brake system and a parking brake system. The service brake system utilizes a brake pedal to apply and release the brakes during normal driving, and it permits the operator to slow or stop the vehicle. Parking brakes lock the wheels of a parked or unattended vehicle. The parking brakes are powerful mechanical spring brakes which are normally held open by air pressure, such that the springs engage the brakes when the pressure is released. To activate the parking brakes, the operator utilizes a manual control valve to release air pressure from the parking brake system. In addition, the parking brakes of an unhitched trailer are automatically engaged due to the release in air pressure as the trailer is uncoupled from the tractor's supply air line.

The braking parameters specified by FMVSS 121 include service brake application timing, service brake release timing, and parking brake timing. Given an initial service brake reservoir pressure of 100 psi, service brake application timing is the time elapsed between the operator applying the brake pedal and the achievement of full braking pressure of 60 psi at all of the brake chambers under test. Service brake release timing is the time elapsed between the operator releasing the brake pedal, with 95 psi in all of the brake chambers, and the reduction of braking pressure to 5 psi at all of the brake chambers under test. An additional point is monitored if the vehicle under test is designed to tow an air brake equipped trailer. The additional monitoring point is located within a 50 cubic inch test reservoir which is temporarily connected to the trailer service brake line at the rear of the vehicle. In this case, the time elapsed until the achievement of full brake application pressure of 60 psi and braking pressure release of 5 psi at the test reservoir is also measured.

Given an initial supply air pressure of 100 psi, parking brake timing is the time elapsed between the operator activating the parking brake control valve or otherwise releasing the air from the system and the reduction of braking pressure to 3 psi at all of the chambers under test. Table 1 summarizes the service brake timing performance standards from FMVSS 121.

TABLE 1

| | Brake Application Time (sec.) | | Brake Release Time (sec.) | |
| --- | --- | --- | --- | --- |
| Type of Vehicle | Brake Chamber from Start to 60 psi. | 50 in$^3$ Reservoir from Start to 60 psi. | Brake Chamber from Start to 5 psi. | 50 in$^3$ Reservoir from Start to 5 psi. |
| Tractors, Trucks, and Buses | 0.45 | 0.35 | 0.55 | 0.75 |
| Single Trailer | 0.60 | n/a | 1.20 | n/a |
| Towing Trailer | 0.50 | 0.50 | 1.00 | 1.00 |
| Converter Dollies | 0.55 | 0.55 | 1.10 | 1.10 |

As a result of FMVSS 121, truck manufacturers and service centers which work on truck and trailer air brake systems need to be able to verify compliance with the performance standards. It is therefore an object of the invention to measure and graphically record the brake application and release timing of service air brake systems and the brake application timing of parking air brake systems. It is another object of the invention to provide a data acquisition system to perform other types of brake system diagnostic tests.

SUMMARY OF THE INVENTION

The present invention provides a brake response analysis system and a test method which measure and record brake pressure data representing the brake application and release timing of service brake systems and the brake application timing of parking brake systems. The brake pressure data are used to determine if a specific vehicle or item of motor vehicle equipment meets the minimum performance requirements of FMVSS 121. As a result, compliance with the service brake and parking brake timing with the parameters set forth in FMVSS 121 may be verified, and other brake system diagnostic tests may be performed.

In a preferred embodiment, the vehicular brake response analysis system includes an electronic control unit, a user interface, and sensors. The user interface and the sensors are coupled to the electronic control unit. The user interface is utilized to select a test methodology which is preferably a service timing test, a parking brake timing test, a dynamic balance test, a static balance test, a brake scan test, or a brake threshold test. A test start sensor which is coupled to the electronic control unit, senses commencement of a test time period, and provides a test start signal. At least one pressure sensor, which is coupled to the electronic control unit, is located at a monitoring point within a vehicular brake system, and the pressure sensor provides at least one pressure signal indicative thereof. The electronic control unit receives the test start and pressure signals, processes the signals according to a test methodology to determine if the performance of the vehicular brake system is within predetermined acceptable standards, and outputs at least one pressure signal to the user interface in graphical and numerical form.

In accordance with another preferred embodiment, the brake response analysis system includes a trailer test rig having a test rig switch and a pressure gauge. The trailer test rig is coupled to at least one of a trailer service brake system and a trailer parking brake system with an air line. The trailer test rig generates brake application and release test pressure for at least one of a trailer service brake system and a trailer parking brake system.

To perform a service brake application and release timing test, a pressure sensor is located at each vehicular service brake chamber. The test start sensor is at least one of a test rig switch and a brake pedal switch, the brake pedal switch is coupled to a vehicular brake pedal. The service brake application timing test measures a time period elapsed between an operator applying brake pressure, given a predetermined brake application start pressure in the service brake chambers, and the achievement of a predetermined brake application pressure at the service brake chambers. The service brake release timing test measures a time period elapsed between the operator releasing brake pressure, given a predetermined brake release start pressure in the service brake chambers, and the reduction of braking pressure to a predetermined brake release pressure at the service brake chambers.

To perform a parking brake timing test, a pressure sensor is located at each vehicular parking brake chamber. The test start sensor is at least one of a pressure transducer which is located at a supply air port on a vehicular parking brake control valve and a pressure transducer which is located within the air line which couples the trailer test rig to the trailer parking brake system. Given a predetermined initial supply air pressure, parking brake timing is the time elapsed between the operator activating the test start sensor by releasing the air from the system and the reduction of braking pressure to a predetermined parking brake release pressure at the parking brake chambers.

Other advantages and features of the invention will become apparent from the following detailed description of the preferred embodiments and the accompanying drawings.

BRIEF DESCRIPTION OF THE DRAWINGS

The invention will now be described with reference to certain preferred embodiments thereof and the accompanying drawings, wherein:

FIG. 6 is a schematic diagram of the brake response analysis system configured to test static and dynamic service brake balance;

FIG. 7 is a schematic diagram of the brake response analysis system configured to perform a threshold test;

DETAILED DESCRIPTION OF THE PREFERRED EMBODIMENTS

Figure 1:
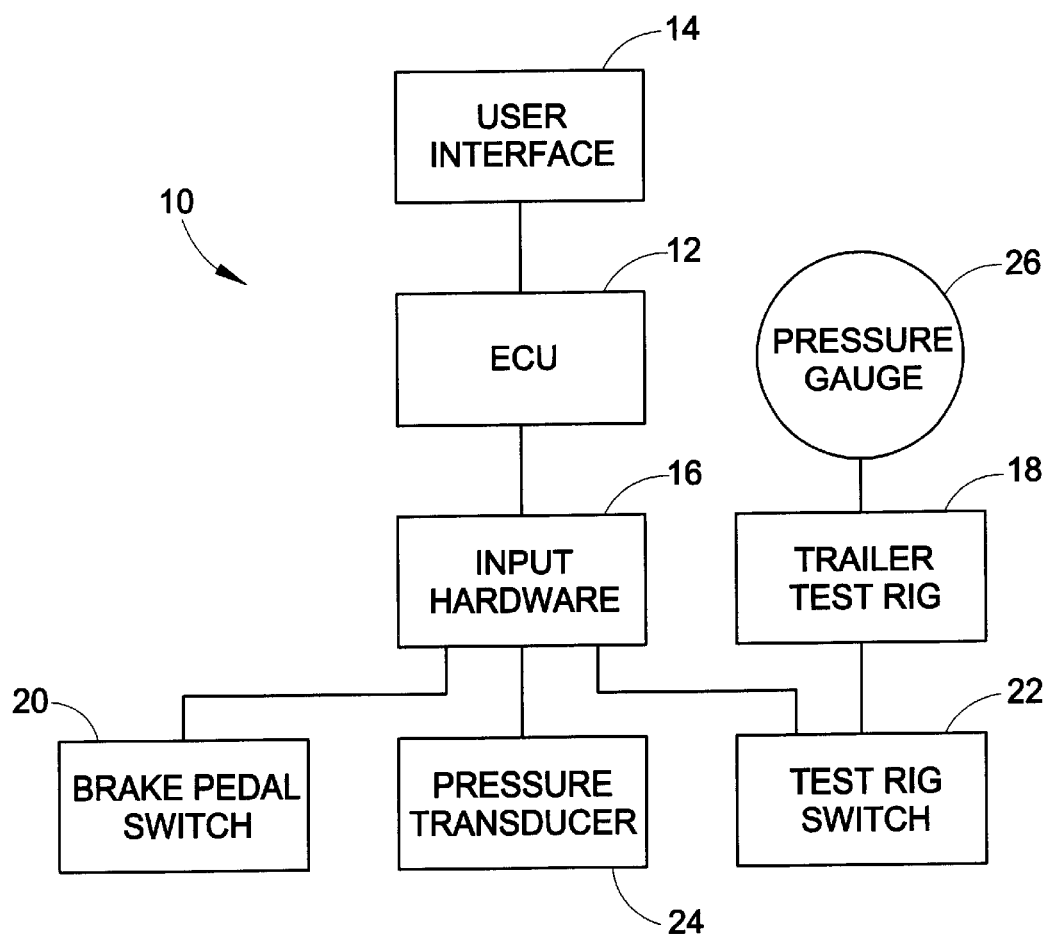
FIG. 1 is a block diagram of the basic components of the brake response analysis system.

FIG. 1 is a block diagram of the basic components of the brake response analysis system 10. The components of the brake response analysis system 10 include a electronic control unit (ECU) 12, a user interface 14, input hardware 16, a trailer test rig 18, and several types of sensors. The sensors preferably include a brake pedal switch 20, a test rig switch 22, and pressure transducers 24.

The ECU 12 is preferably incorporated into a standard personal computer (PC), which utilizes a standard operating system such as Microsoft Windows. The ECU 12 is preferably a microprocessor-based controller which stores various programmed calculations for performing the brake response analysis system algorithm, as explained hereinafter. The user interface 14 preferably includes a display monitor, a printer, and a keyboard (not shown) which are connected to the ECU 12. If a portable notebook PC is utilized, the brake response analysis system 10 may run entirely off of a vehicular DC battery power supply. The input hardware 16 preferably has eight serial data input ports (not shown), and the input hardware 16 may be either internal or external to the ECU 12.

Figure 3:
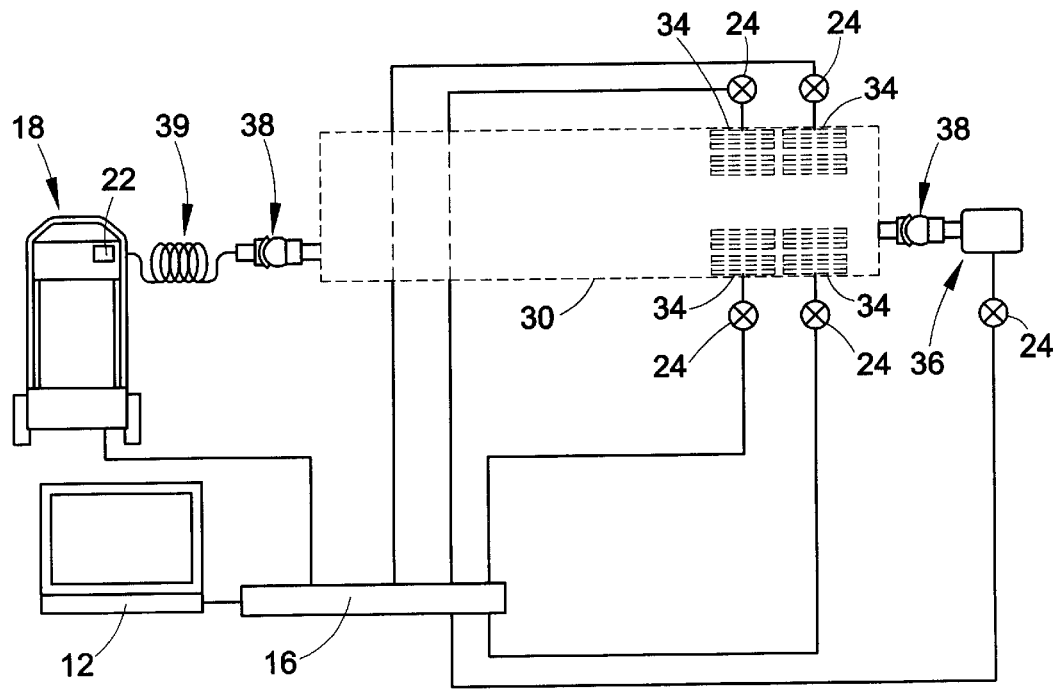
FIG. 3 is a schematic diagram of the brake response analysis system configured to test trailer service brake timing.
Figure 5:
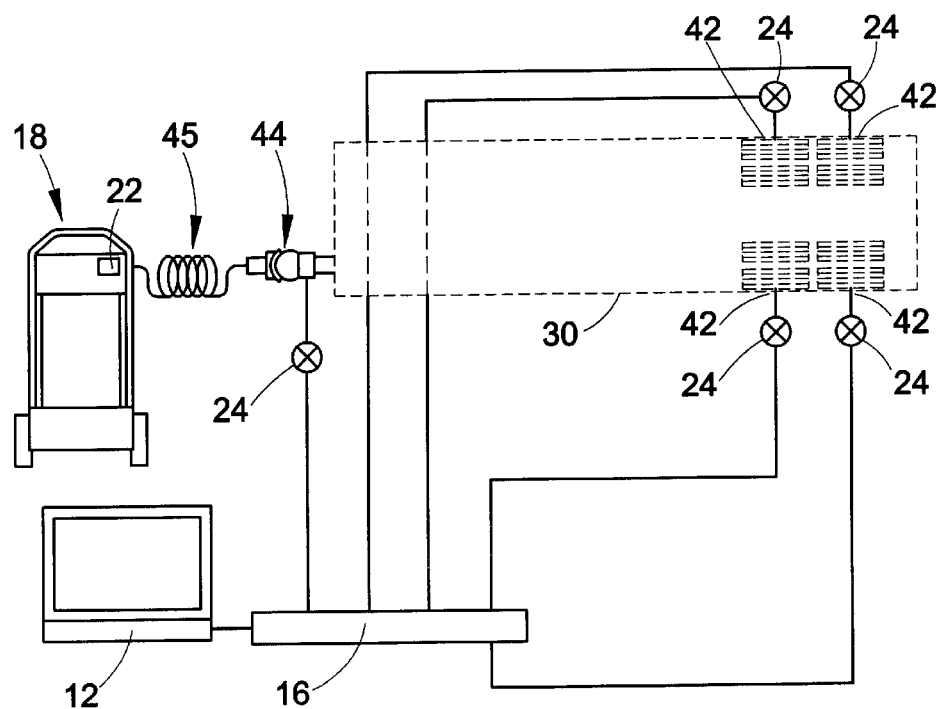
FIG. 5 is a schematic diagram of the brake response analysis system configured to test trailer parking brake timing.

Referring now to FIGS. 1, 3, and 5, the trailer test rig 18 is a self contained air pressure source which simulates an air supply from a tractor which is either service air or supply air. The trailer test rig 18 includes an analog pressure gauge 26 and a test rig switch 22. The test rig switch 22 is a manual switch which is utilized to initiate simulated operator controlled service brake application and release. An air line with a gladhand fitting may be utilized to connect the trailer test rig 18 to either the service air gladhand fitting or the supply air gladhand fitting on the trailer.

The sensors 20, 22 and 24 are preferably connected to input hardware 16 of the ECU 12 with control wiring. In accordance with another preferred embodiment of the invention, the sensors may be coupled to the input hardware 16 with a wireless system that utilized RF or IR transmission, or alternatively they may transmit an electrical pulse signal via the frame of the vehicle to control wiring that is coupled to the input hardware 16. The pressure transducers 24 sense changes in air pressure within a vehicular air braking system and they generate pressure signals indicative thereof. The pressure transducer 24 is preferably be located at an air brake chamber. In accordance with another preferred embodiment, the pressure transducer 24 may be located at any other monitoring point within the air braking system. The brake pedal switch 20 and the test rig switch 22 are motion sensing accelerometers.

Figure 2:
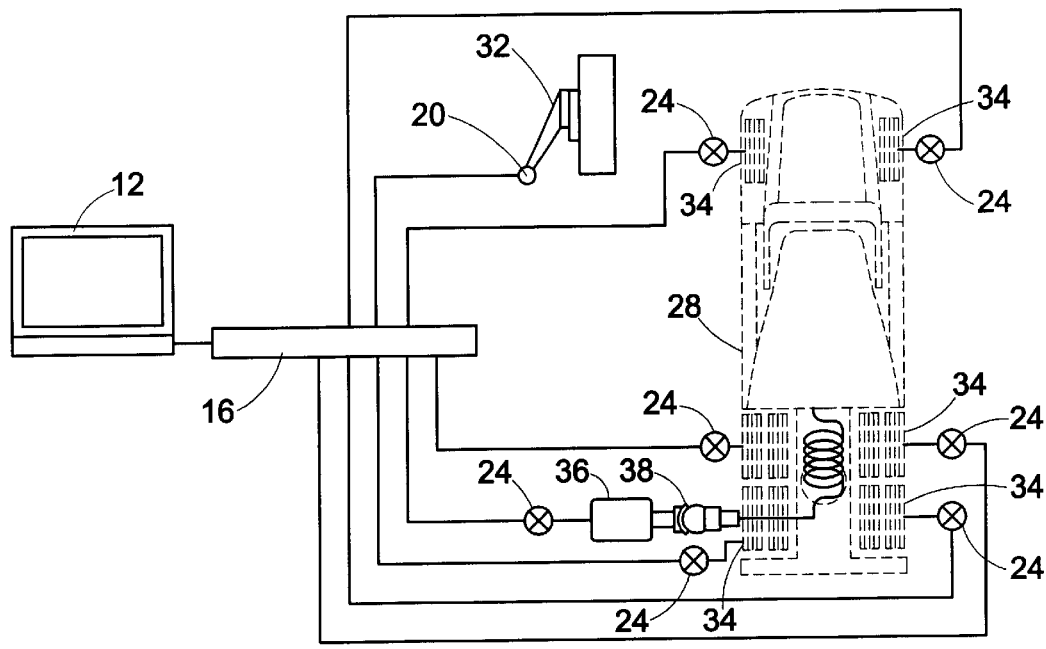
FIG. 2 is a schematic diagram of the brake response analysis system configured to test tractor service brake timing.

FIGS. 2 and 3 illustrate the test hardware setups to measure service brake timing for a tractor 28 and a trailer 30 respectively. As shown in the tractor service brake hardware setup of FIG. 2, the brake pedal switch 20 is coupled to a vehicular brake pedal 32 and upon detection of brake pedal movement the brake pedal switch 20 sends a brake pedal acceleration signal to one of the input data ports on the input hardware 16. As shown in FIGS. 2 and 3, pressure transducers 24 are preferably located at each wheel-mounted service brake chamber 34, and they send pressure signals representing service braking pressure at each individual wheel to the data ports on the input hardware 16. As shown in FIG. 3, a trailer test rig 18 is coupled to the service brake gladhand 38 of the trailer with an air line 39. If the tractor or trailer is designed to tow another vehicle which is equipped with air brakes, a 50 cubic inch test reservoir 36 is coupled to the service brake gladhand fitting. A pressure transducer 24 is connected to the test reservoir 36, and a pressure signal representing the pressure in the 50 cubic inch test reservoir 36 is sent to a data port on the input hardware 16.

Figure 4:
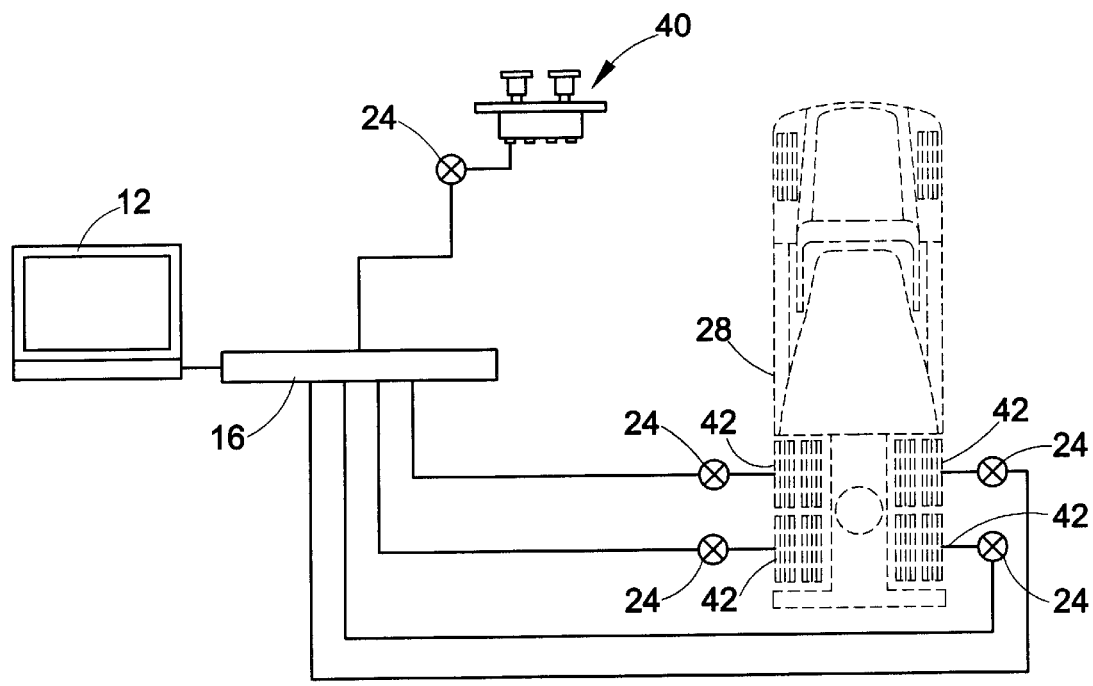
FIG. 4 is a schematic diagram of the brake response analysis system configured to test tractor parking brake timing.

FIGS. 4 and 5 illustrate test hardware setups to measure parking brake timing for a tractor 28 and a trailer 30 respectively. As shown in FIG. 4, a pressure transducer 24 is coupled to a supply air port on a dashboard mounted parking brake control valve 40, and it sends a pressure signal to a data port on the input hardware 16. As shown in FIGS. 4 and 5, pressure transducers 24, are located at each wheel-mounted parking brake chamber 42, and they send parking brake pressure signals to the data ports on the input hardware 16. As shown in FIG. 5, the trailer test rig 18 is coupled to the supply air line gladhand 44 of the trailer 30 with an air line 45. A pressure transducer 24 is located at the supply gladhand 44, and it sends a pressure signal to one of the data ports on the input hardware 16.

FIG. 6 illustrates the test hardware setup for the service brake dynamic balance test and the service brake static balance test. A pressure transducer 24 is installed at the service gladhand 38, and pressure transducers 24 are installed at the wheel-mounted service brake chambers 34. The pressure transducers 24 are connected to data ports on the input hardware 16.

FIG. 7 illustrates the test hardware setup for the threshold service brake test. For this test setup, a single pressure transducer 24 is installed at a service brake chamber 34. The pressure transducer 24 is connected to a data port on the input hardware 16.

The service brake scan test offers the most flexibility, and the test hardware may be configured as shown in any of the previous setups, see FIGS. 2–7. Further, a pressure transducer 24 may be installed at an air reservoir, or at any other monitoring point within the air braking system that the test operator chooses to monitor.

Figure 8:
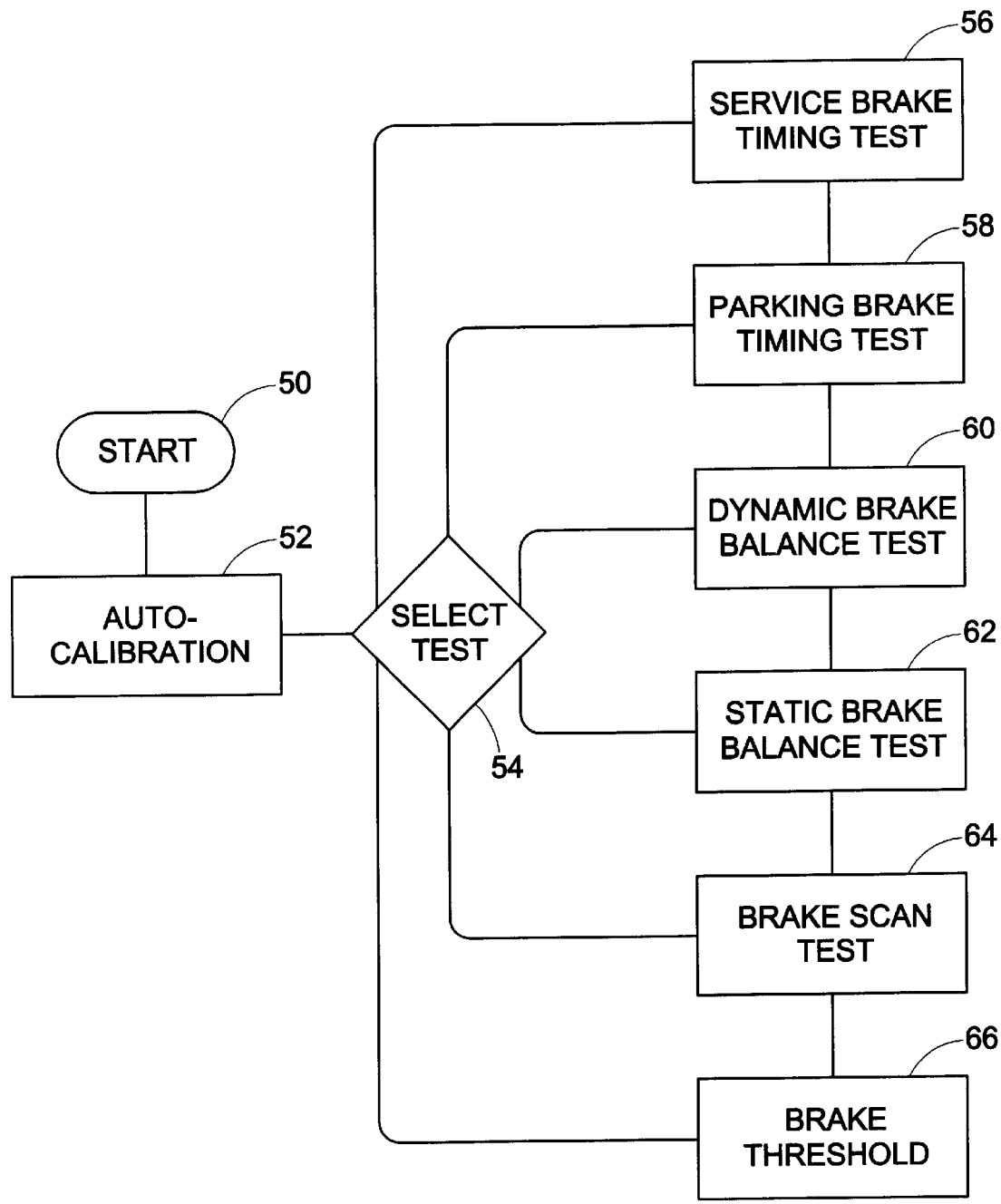
FIG. 8 is a logic diagram which depicts the control algorithm for the brake response analysis system.

The operation of the brake response analysis system 10 will now be described. FIG. 8 is a control diagram which depicts the operation of the ECU 12. The ECU 12 monitors the sensors and communicates with the operator via the display and keyboard, performs the desired tests selected by the operator, and generates numeric and graphical test results. The brake response analysis system methodology begins at start point 50 and proceeds to auto calibration block 52.

To calibrate the pressure transducers 24, the operator is prompted to apply 0 psi to the pressure transducers 24. The brake response analysis system 10 then reads the pressure signal in bitcount units from each pressure transducer 24. The operator is then prompted to apply 100 psi to the pressure transducers 24. The brake response analysis system 10 again reads the pressure signal in bitcount units from each pressure transducer 24. As a result, pressure transducer readings in bitcount units for the 0 psi and 100 psi calibration levels are known. These calibration readings are used to adjust subsequent pressure readings from bitcount units to psi using the following formula:

pressure reading(psi)=(raw transducer pressure reading in bitcount units)–0 psi calibration level)/(100 psi calibration level–0 psi calibration level)*100

EXAMPLE

As shown in the following sample calculation, a raw transducer pressure reading of 7500 in bitcount units may be calibrated to a pressure reading in psi. During initial calibration at 0 psi the pressure transducer reading is 4300 bitcount units, at 100 psi the pressure transducer reading is 17300 bitcount units. The raw transducer pressure reading in bitcount units is 7500 bitcount units. The following calculation is utilized to calibrate raw transducer pressure reading in bitcount units to a pressure reading in psi:

(7500–4300)/(17300–4300)*100=24.6 psi.

Next, the methodology proceeds to decision block 54, wherein one of six available test programs may be selected by the test operator. Control diagrams for these six test programs are respectively illustrated in FIGS. 9–14 and they include: 1. Service brake timing test 56, see FIG. 9; 2. Parking brake timing test 58, see FIG. 10; 3. Dynamic brake balance test 60, see FIG. 11; 4. Static brake balance test 62, see FIG. 12; 5. Brake scan test 64, see FIG. 13; and 6. Brake threshold test 66, see FIG. 14. After test selection, the methodology executes the selected test.

1. Service Brake Timing Test 56

Figure 9:
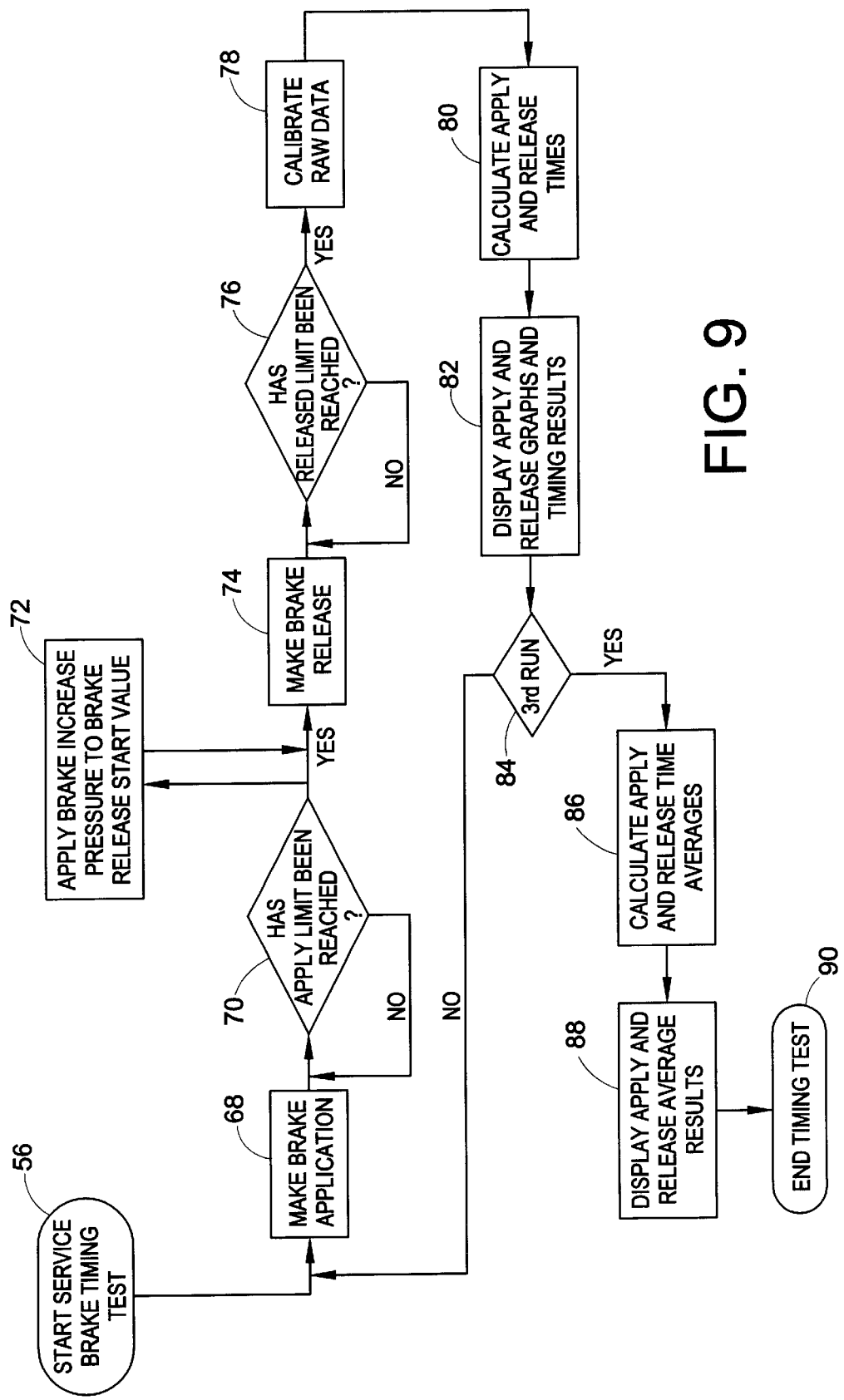
FIG. 9 is a logic diagram which depicts the control algorithm for the service brake timing test.

The objective of the service brake timing test is to verify that a truck, bus, or trailer complies with the performance standards set forth in FMVSS 121, see Table 1. Referring now to FIG. 9, execution of the service brake timing test commences with start point 56 and proceeds to brake application block 68. To commence testing the tractor service brakes utilizing the test set up shown in FIG. 2, the test operator applies the brake pedal 32 which is connected to the brake pedal switch 20. To commence testing the trailer service brakes utilizing the test set up illustrated in FIG. 3, the test operator activates the test rig switch 22 on the trailer test rig 18 to apply braking pressure to the trailer 30, causing a start signal to be sent to the ECU 12.

Following brake application, the methodology proceeds to decision block 70, wherein the minimum value of the service brake chamber pressure signals is compared to the brake application limit value of 60 psi. If the brake application limit value of 60 psi has not been reached at all of the service brake chambers 34, the methodology continues to receive the increasing service brake pressure signals from the service brake chambers 34.

Once the brake application limit value is met, the next step is to increase braking pressure to the brake release start value of 95 psi at the service brake chambers 34. The methodology proceeds to block 72, wherein the minimum value of the service brake chamber pressure signals is compared to the brake release start value. If the brake release start value of 95 psi has not been reached, the methodology continues to receive the increasing service brake pressure signals from the service brake chambers 34. Once the brake release start value is met, the methodology proceeds to block 74, wherein the brake pressure is released. For the tractor service brake timing test, the brake response analysis system 10 prompts the tractor operator to manually release the brake, and for the trailer service brake timing test, the brake response analysis system 10 prompts the test operator to manually release the braking pressure switch located on the test rig.

After brake release, the methodology proceeds to decision block 76, wherein the maximum value of the service brake chamber pressure signals is compared to a brake release stop value of 5 psi. If the brake release stop value has not been achieved at all wheels, the methodology continues to receive the decreasing service brake chamber pressure signals. If the brake release stop value is met, the methodology proceeds to block 78 wherein the raw pressure transducer signals are calibrated from bitcount to psi values in accordance with the predetermined calibration values. Next, at calculation block 80 the brake application and release times are calculated for the last service brake chamber to apply and for the last service brake chamber to release. The methodology proceeds to display block 82, wherein brake application and release graphs and brake timing results are generated and displayed. Next, the methodology proceeds to counting decision block 84, which returns to brake application block 68 until the test has been repeated three times. Once the methodology stops acquiring new data and proceeds to calculation block 86, the average brake application and release times are calculated for each wheel. Next, at display block 88, the average brake application and release graphs and brake timing results are displayed Finally, the methodology concludes at end point 90.

2. Parking Brake Timing Test

Figure 10:
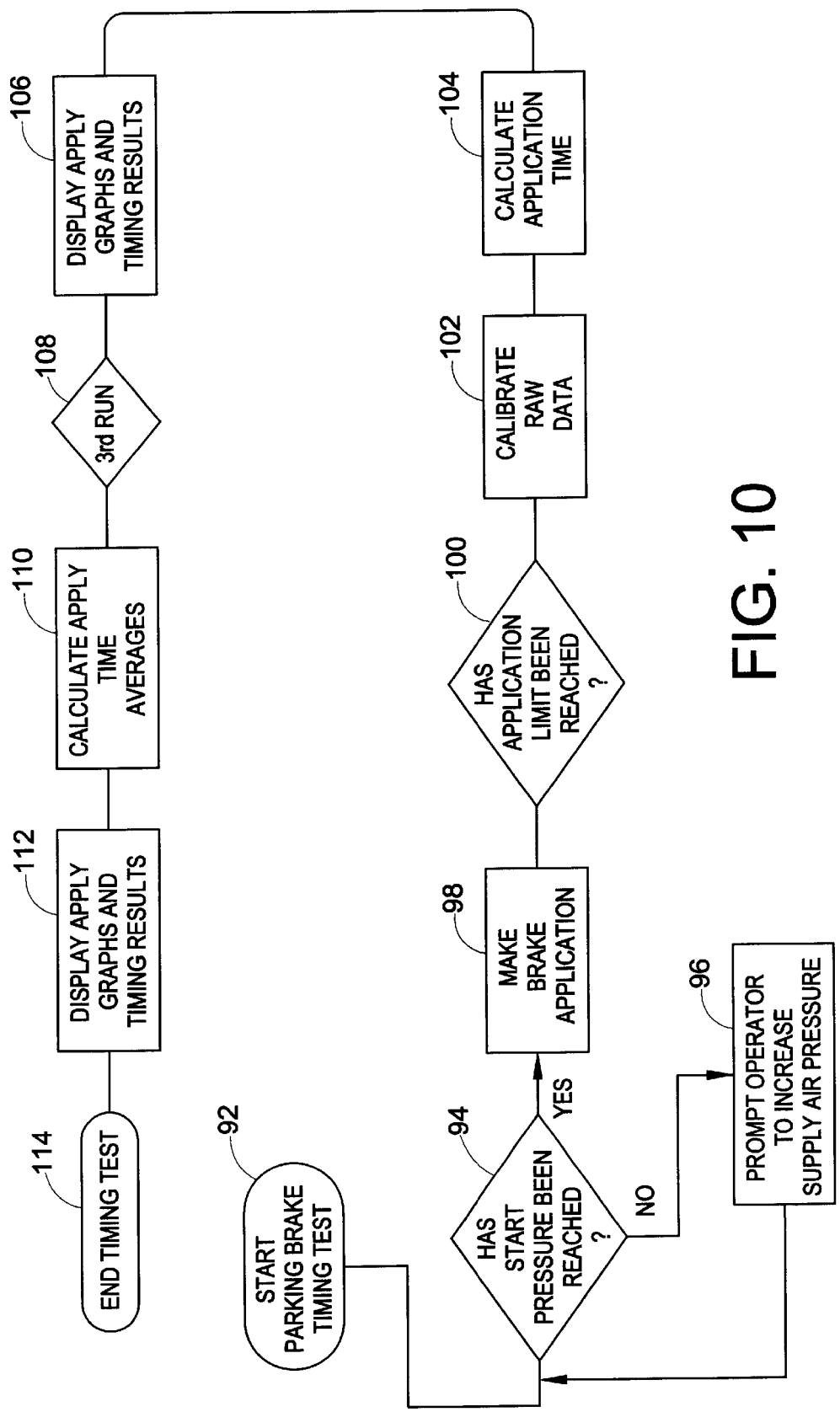
FIG. 10 is a logic diagram which depicts the control algorithm for the parking brake timing test.

The objective of the parking brake timing test is to verify that a truck, bus, or trailer complies with the performance standards set forth in FMVSS 121. Referring now to FIG. 10, execution of the parking brake timing test commences with start point 92 and proceeds to decision block 94. The brake response analysis system 10 reads the pressure in the parking brake supply air system to verify that it is at the parking brake application start pressure of 100 psi. If the pressure in the parking brake supply air system is less than 100 psi, the operator is prompted to increase the pressure. If the pressure is 100 psi or greater, the methodology proceeds to parking brake application block 98. To commence testing the tractor parking brakes utilizing the test set up shown in FIG. 4, the test operator releases the air from the air brake system by applying the parking brake control valve. To commence testing the trailer parking brakes utilizing the test set up illustrated in FIG. 5, the test operator releases the air from the air brake system by uncoupling the trailer from the trailer test rig 18. At the moment of air release a pressure signal which indicates the drop in pressure is sent to the ECU 12 to commence timing the test. For a tractor 28, the start test pressure signal is transmitted by a pressure transducer located at the parking brake control valve 40. For a trailer 30, the start test pressure signal is transmitted by a pressure transducer located at the supply gladhand 38.

After parking brake application, the methodology proceeds to decision block 100, wherein the maximum value of the parking brake chamber 42 pressure signals is compared to the brake application stop value of 3 psi. If the brake application stop value of 3 psi has not been reached, the methodology continues to receive the decreasing parking brake pressure signals from the parking brake chambers 42. If the brake application stop value is met, the methodology proceeds to block 102 wherein the raw pressure transducer signals are calibrated from bitcount to psi values in accordance with the predetermined calibration values. Next, at calculation block 104 the brake application times are calculated for the last parking brake chamber 42 to apply. The methodology proceeds to display block 106, wherein brake application and release graphs and brake timing results are generated and displayed. Next, the methodology proceeds to decision counting block 108, which causes the test to be performed three times. Thereafter, the methodology stops acquiring new data and proceeds to calculation block 110, wherein the average parking brake application time is calculated for each wheel. Next, at display block 112, the average brake application graphs and brake timing results are displayed. Finally, the methodology proceeds to end point 114 and stops the parking brake timing test.

3. Dynamic Brake Balance Test

Figure 11:
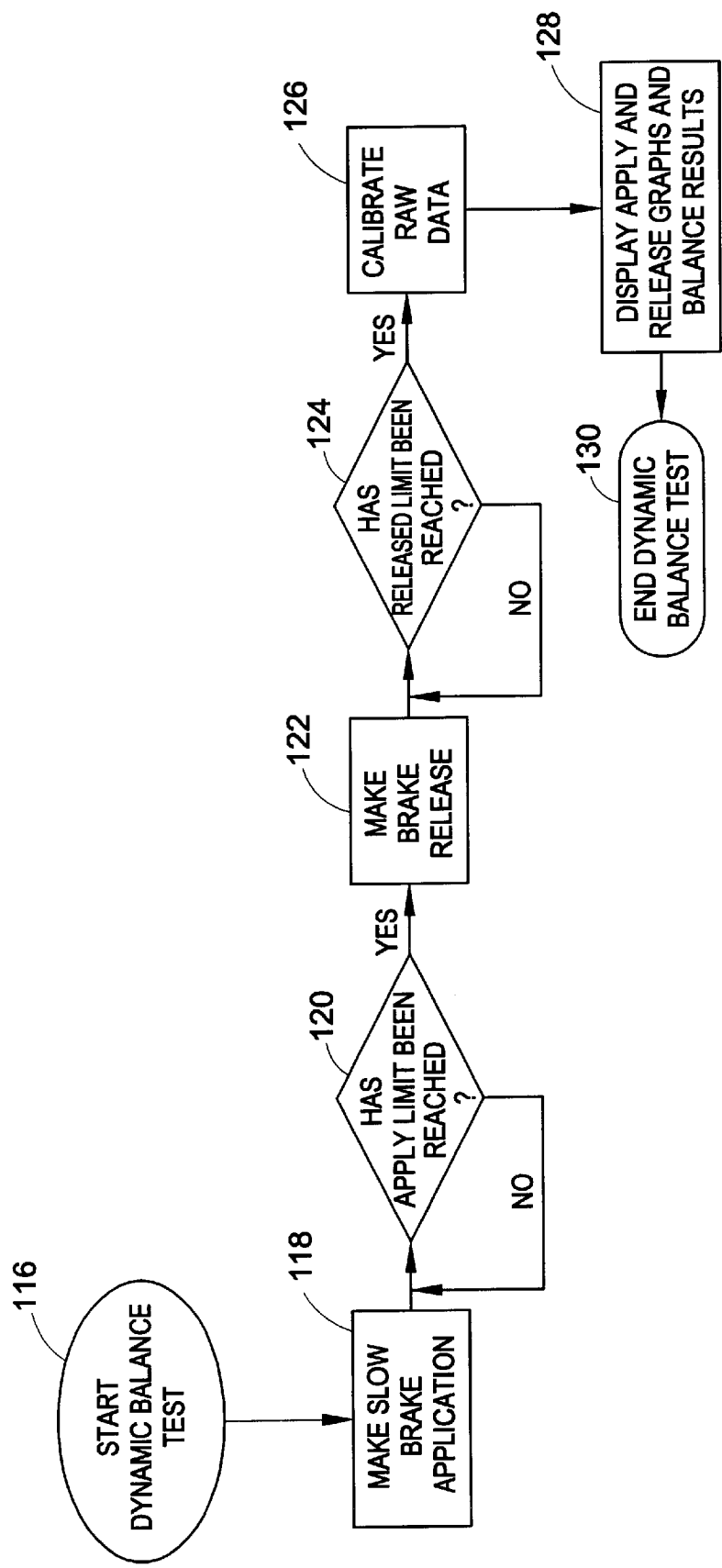
FIG. 11 is a logic diagram which depicting the control algorithm for the dynamic balance test.
Figure 12:
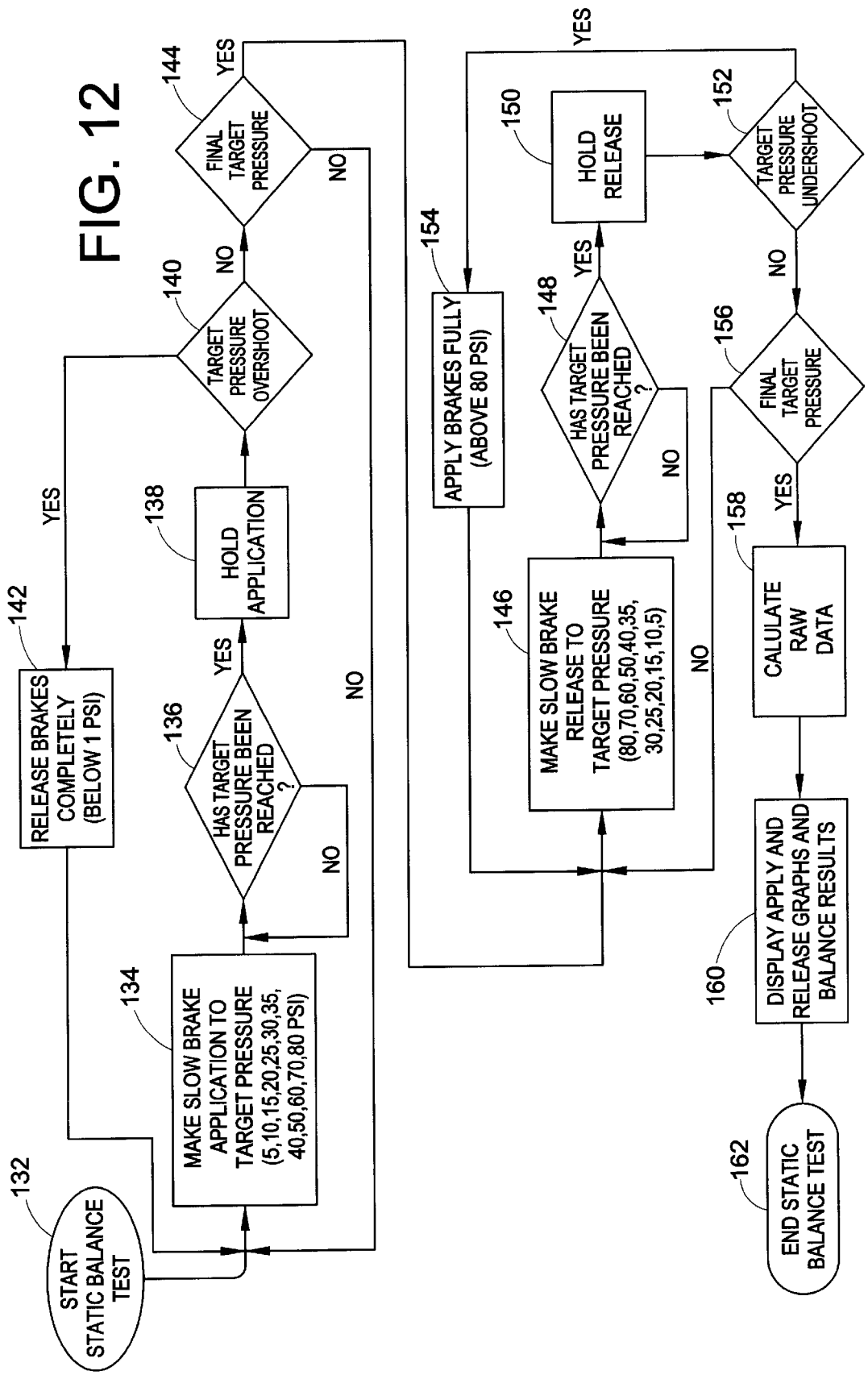
FIG. 12 is a logic diagram which depicts the control algorithm for the static brake balance test.

The objective of the dynamic brake balance test is to determine the air pressure differences between the axles of a single or combination vehicle. To execute the dynamic brake balance test, the operator utilizes the test hardware setup shown in FIG. 6. Referring now to FIG. 11, execution of the dynamic brake balance test commences at start point 116 and proceeds to application block 118, wherein the test operator slowly applies the brakes generating a brake control pressure signal at the pressure transducer 24 located at the service brake gladhand. The increasing brake control pressure signal starts the test and commences the collection of data from the service brake chamber pressure transducers 24. After brake application, the methodology proceeds to decision block 120, wherein the brake control pressure signal is compared to the brake application pressure limit value, which is preferably 80 psi. Once the brake application pressure limit value has been reached, the methodology proceeds to block 122 wherein the brake is released. After commencement of brake release, the methodology proceeds to decision block 124, wherein the brake control pressure signal value are compared to the brake release limit value, which is preferably 0 psi. Once the brake release limit value is met, the methodology calibrates the raw pressure transducer signals at block 126. Next, at display block 128, brake control pressure during application and release and the pressure for each brake chamber are graphed as a function of time. Finally, the methodology terminates at end point 130.

4. Static Brake Balance Test

The objective of the static brake balance test is to determine the air pressure differences between the axles of a single or combination vehicle at a series of stepped pressures. To execute the static brake balance test, the operator utilizes the test hardware setup shown in FIG. 6. Referring now to FIG. 11, execution of the static brake balance test commences at start point 132 and proceeds to block 134 wherein the test operator slowly applies the brakes. Preferably, the target pressure step value is initially set at 5 psi. A brake control pressure signal is generated at the pressure transducer 24 which is located at the service gladhand 38. The increase in the pressure signal from the control pressure transducer 24 triggers the start of the test and commences the collection of data from the service brake chamber 34 pressure transducers 24. The methodology proceeds to decision block 136, wherein the brake control pressure signal is compared to the brake application pressure target step value, which is sequentially increased from 5 psi to 80 psi by the To following steps: 5, 10, 15, 20, 25, 30, 35, 40, 50, 60, 70, 80 psi. Once the brake application target step value is met, the methodology proceeds to hold application block 138, wherein the braking pressure is held at the target pressure for a predetermined time period. After this time period, the methodology proceeds to decision block 140 wherein if the target pressure is overshot, the brakes are released at block 142 and the methodology returns to the initial brake application block 134. If the target pressure has not been overshot, the methodology proceeds to decision block 144 returns to the initial brake application block 134 and to repeat the test at the next step value. If the target step value equals the final target step value, the methodology proceeds to the brake release block 146.

Figure 15:
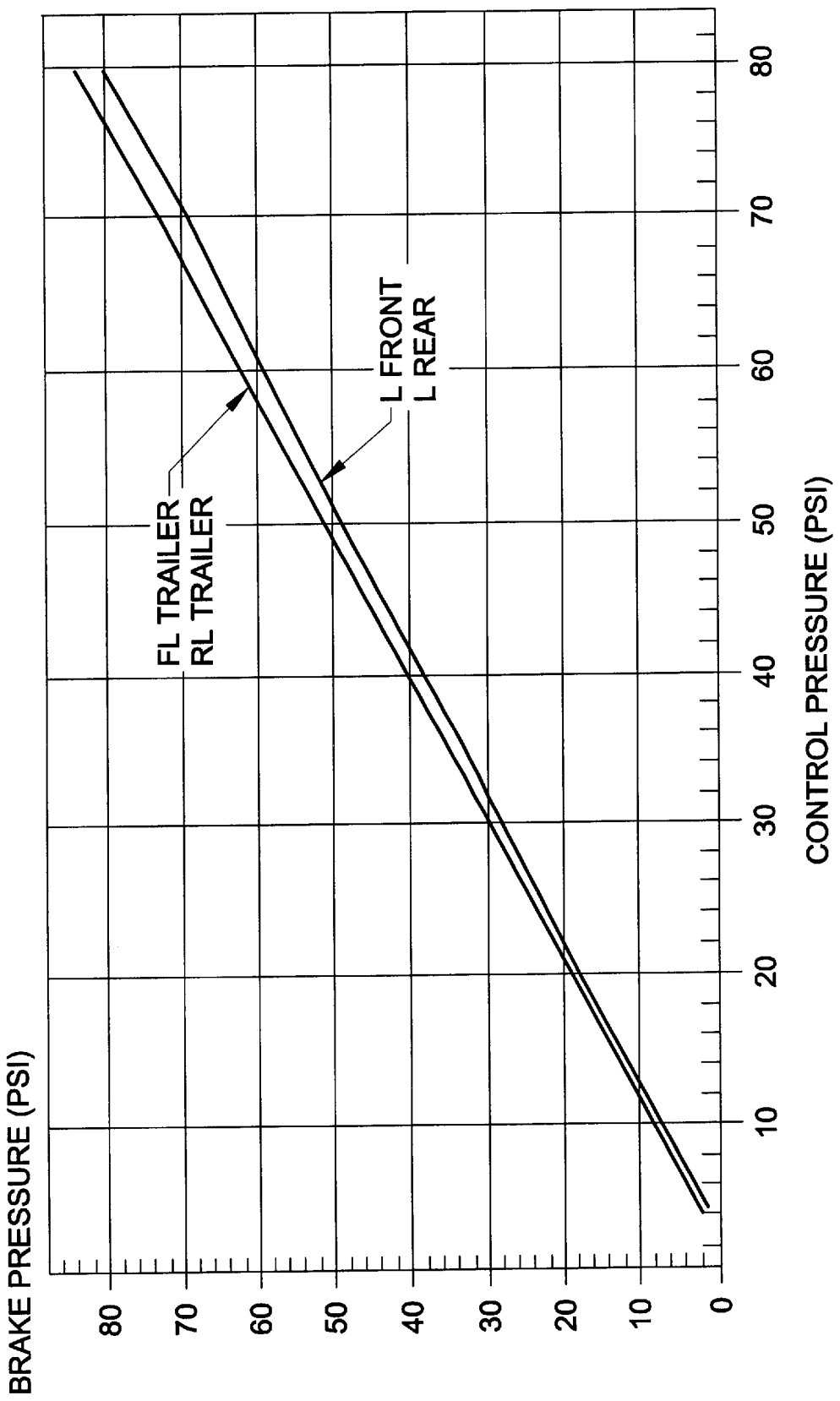
FIG. 15 is a sample of the display output from a static pressure balance test during service brake application.
Figure 16:
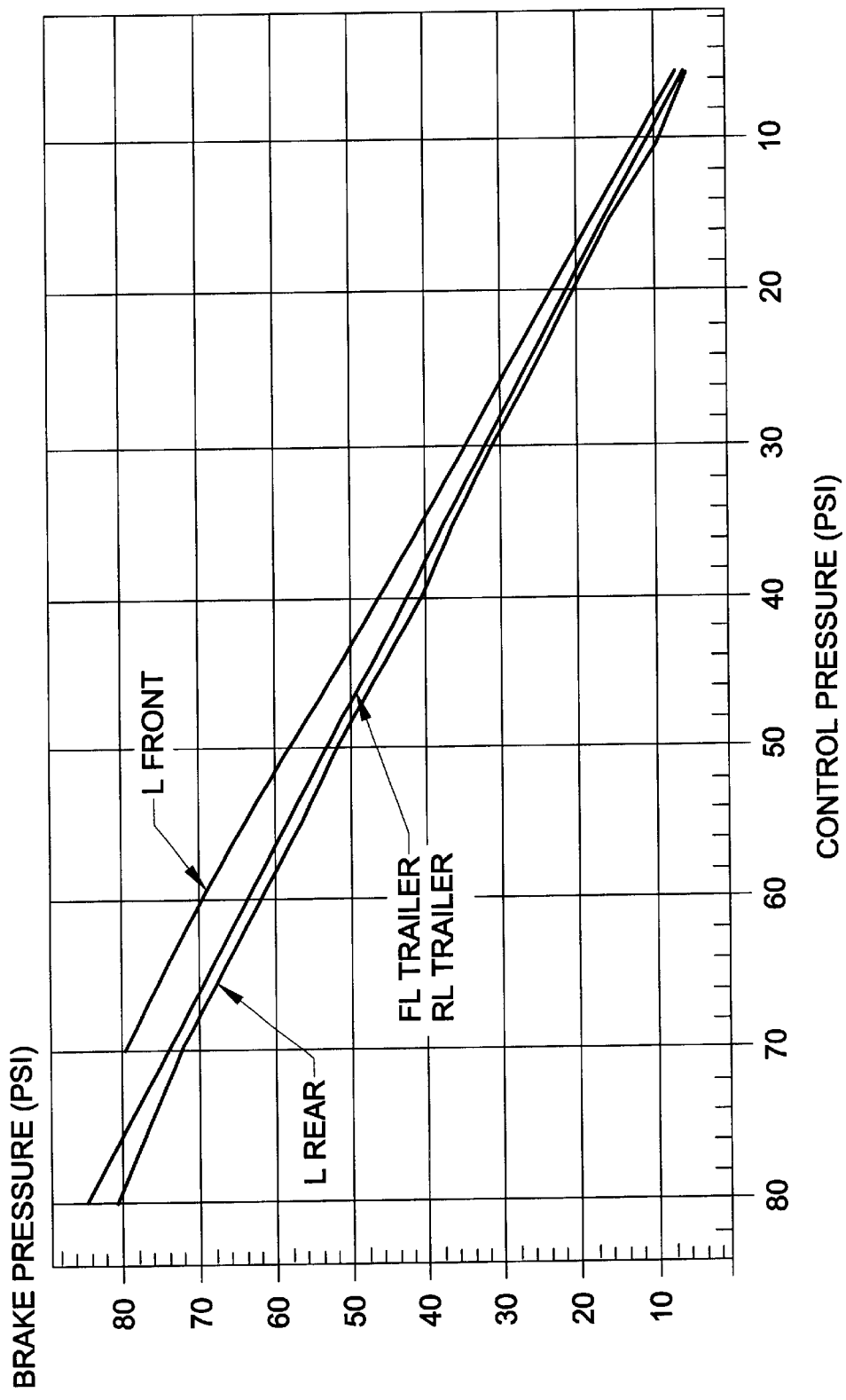
FIG. 16 is a sample of the display output from a static pressure balance test during service brake release.

After commencement of brake release, the methodology proceeds to decision block 148, wherein the brake control pressure signal is compared to the brake release pressure target step value, which is sequentially decreased from 80 psi to 5 psi according to the following steps: 80, 70, 60, 50, 40, 35, 30, 25, 20, 15, 10, 5 psi. Once the brake application target step value is met, the methodology proceeds to hold release block 150, wherein the braking pressure is held at the target pressure for a predetermined time period. After this time period, the methodology proceeds to decision block 152 wherein if the target pressure is undershot, the brake is applied fully at block 154 and the test repeated from initial brake application block 146. Otherwise, the methodology proceeds to decision block 156 which repeats the test from initial brake application block 146 until the final step value has been reached. The methodology then calibrates the raw pressure transducer signals at block 158 using the calibration formula. Next, at display block 160, brake control pressure during application and release and the pressure at each individual brake chamber are graphed as a function of time. Finally, the methodology terminates at end point 162. FIG. 15 is an example of the display output from a static pressure balance test during service brake application, and FIG. 16 is an example of the display output from a static pressure balance test during service brake release.

5. Scan Test

Figure 13:
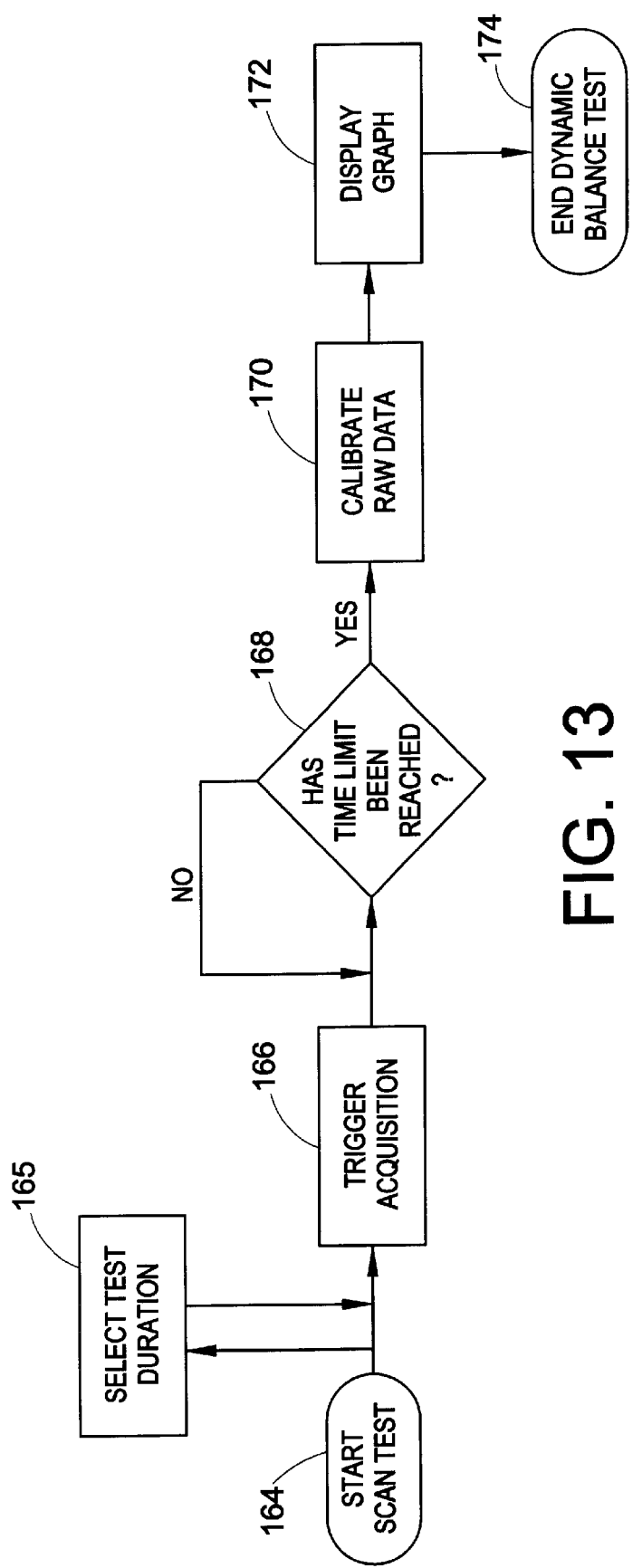
FIG. 13 is a logic diagram which depicts the control algorithm for the brake scan test.
Figure 17:
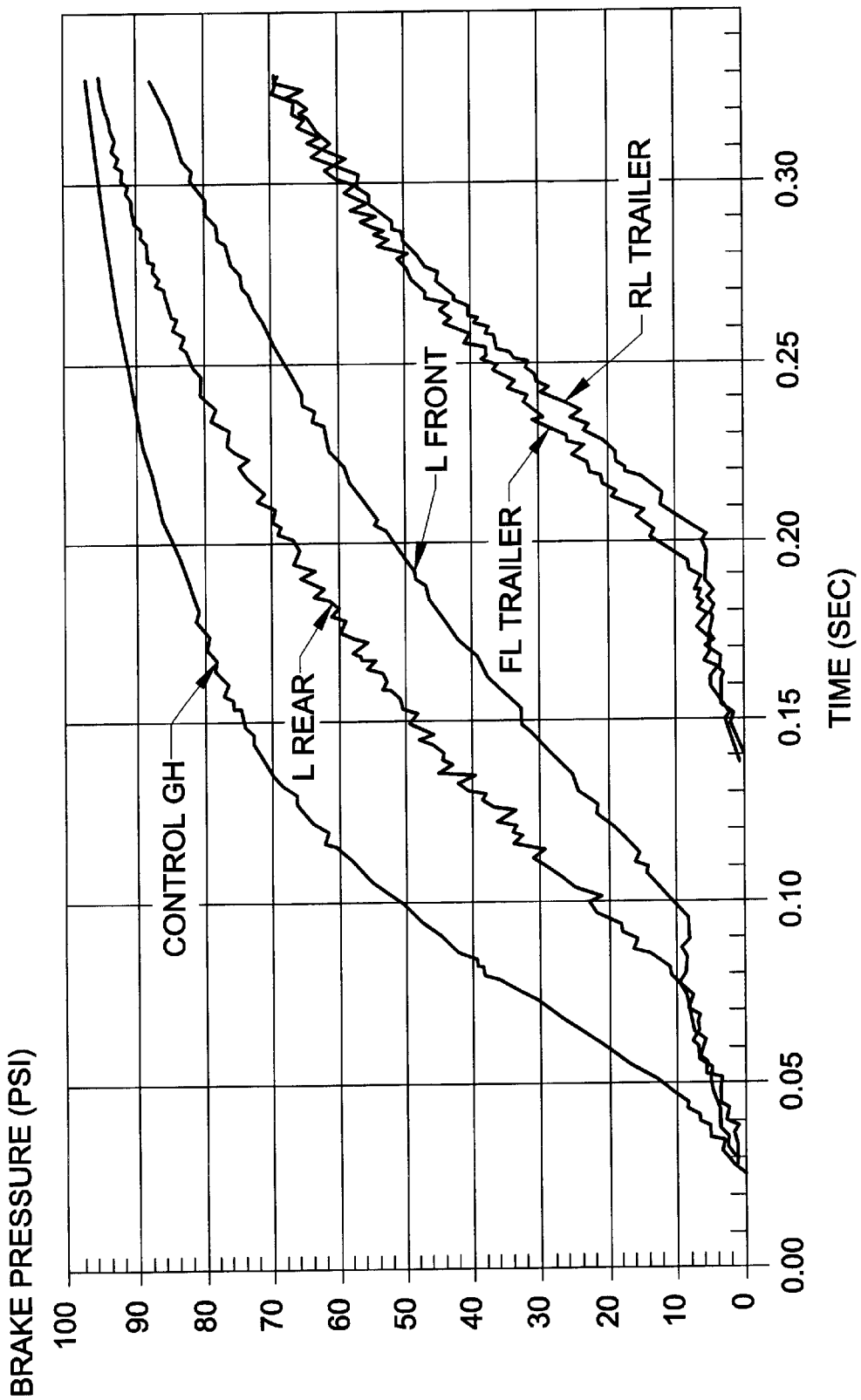
FIG. 17 is a sample of the display output from a scan test during service brake application.
Figure 18:
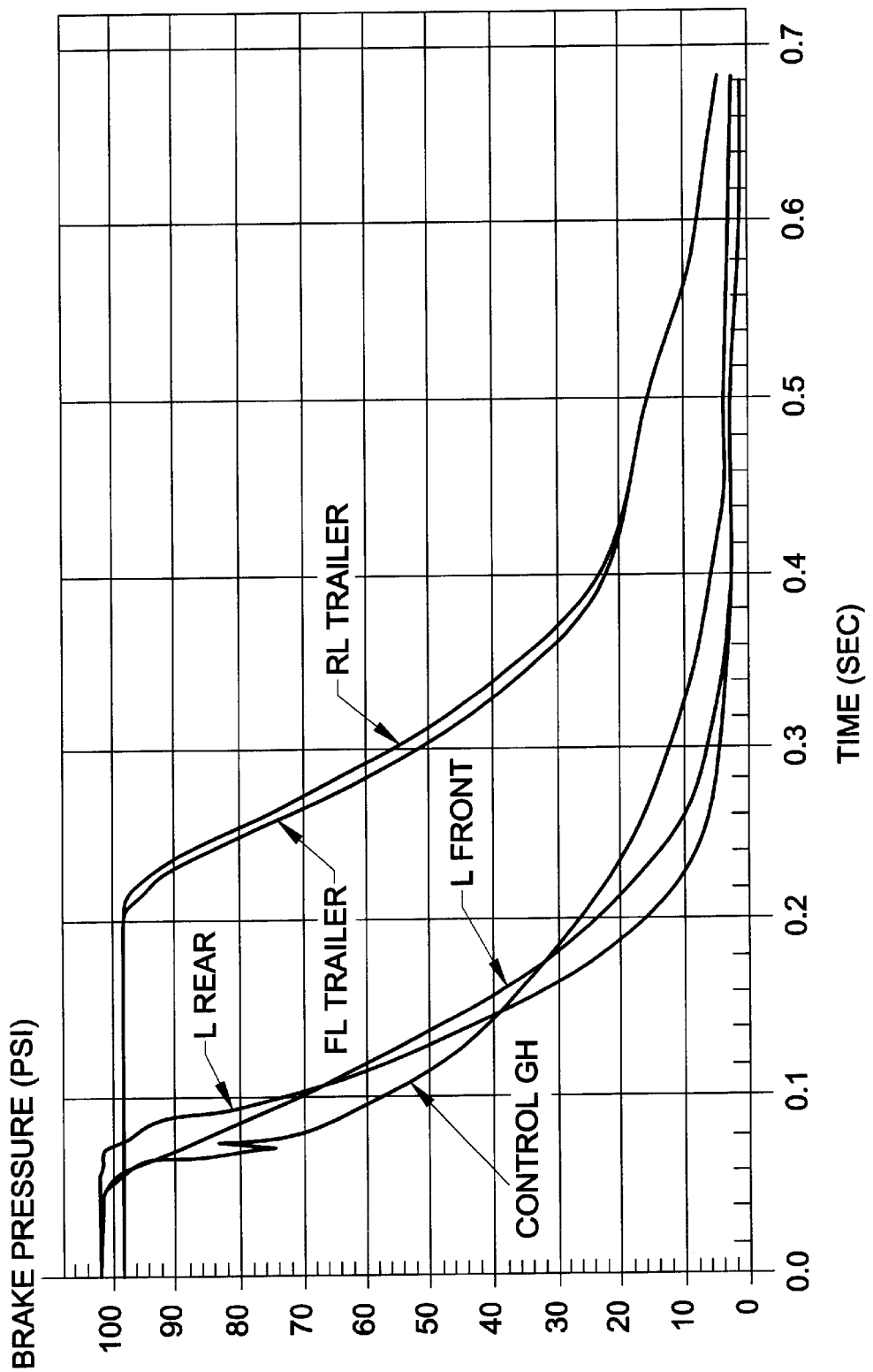
FIG. 18 is a sample display output from a scan test during service brake release.

The scan test is utilized to perform general diagnostics or specific troubleshooting on an air brake system, and it permits the flexibility to perform tests outside the specifications set forth in the brake timing and balance tests. FIG. 13 is a flow chart of the brake scan test. Execution of the scan test commences at start point 164, then proceeds to block 165 where the duration of the test is preferably selected by the operator. Next, the methodology proceeds to trigger acquisition block 166 wherein the test operator commences the test either by (1) applying the brake pedal 32 to generate a brake pedal switch 20 signal or (2) applying a keystroke at the user interface 14. The scan test is capable of monitoring air pressure at any monitoring point within the braking system, such as an air reservoir or a port on a brake system valve. Next, the methodology proceeds to decision block 168 which causes data to be collected until the test time has elapsed. The methodology then calibrates the raw pressure transducer signals at block 170. Next, at display block 172, brake pressure at each individual monitoring point is graphed as a function of time and displayed on the monitor. Finally, the methodology terminates at end point 174. FIG. 17 is an example of the display output from a scan test during service brake application, and FIG. 18 is an example of the display output from a scan during service brake release.

6. Brake Threshold Test

Figure 14:
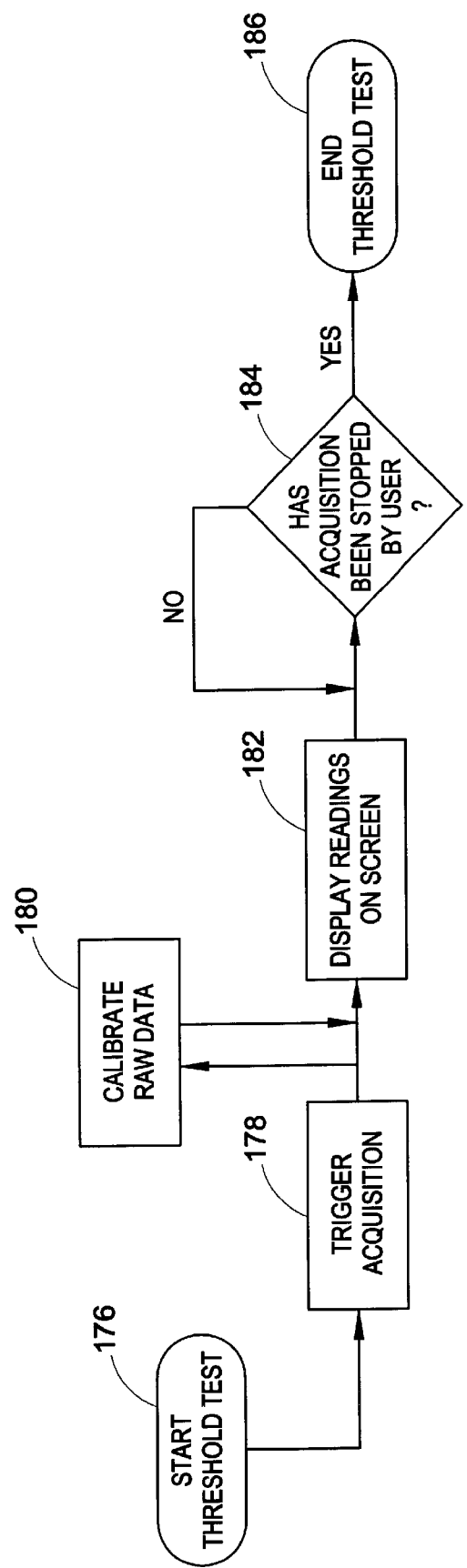
FIG. 14 is a logic diagram which depicts the control algorithm for the brake threshold test.

The objective of the brake threshold test is to determine the braking pressure required to make and release contact between the brake lining and the brake drum at each wheel. The test is performed during manual rotation of an individual wheel. To execute the brake threshold test, the operator utilizes the test hardware setup shown in FIG. 7. The wheel under test is raised with a floor jack until the tire is no longer in contact with the ground. Next the wheel is manually rotated. Referring now to FIG. 14, execution of the test commences at start point 176. At acquisition block 178, a brake pressure signal is received from a pressure transducer located at the service brake chamber 34 under test. At block 180 raw pressure transducer signals is adjusted to psi using the calibration formula. The brake response analysis system 10 commences receiving and displaying brake chamber pressure data at block 182 while an operator continues to manually rotate the wheel, and another operator gradually applies the brake pedal 32. When the braking torque (drag) occurs, the operator reads the brake pressure off of the display and ends the brake application threshold test. Next, the brake release threshold test is commenced. The second operator gradually releases the brake pedal while the first operator attempts to manually rotate the wheel. When the wheel can be freely rotated, the operator reads the brake pressure off of the display and ends the brake release threshold test. At decision block 184, the methodology determines whether or not the operator has stopped the test. Finally, the methodology terminates at end point 186.

The invention has been described with reference to certain preferred embodiments thereof. It will be understood, however, that modifications and variations are possible within the scope of the appended claims.

What is claimed is:

1. A vehicular brake response analysis system comprising:

an electronic control unit;

a user interface coupled to the electronic control unit;

a test start sensor coupled to the electronic control unit which senses commencement of a test time period and provides a test start signal indicative thereof, and at least one pressure sensor which is coupled to the electronic control unit, is located within at least one monitoring point within a vehicular brake system, and provides at least one pressure signal indicative thereof;

wherein the electronic control unit receives the test start and pressure signals, processes the signals according to a test methodology to determine if the performance of the vehicular brake system of a stationary vehicle is within predetermined acceptable standards, and outputs at least one pressure signal to the user interface in graphical and numerical form.

2. A vehicular brake response analysis system as claimed in claim 1, further comprising:

a trailer test rig having a test rig switch which is coupled to the electronic control unit and a pressure gauge; and an air line which couples the trailer test rig to at least one of a trailer service brake system and a trailer parking brake system;

wherein the trailer test rig generates brake application and release test pressure for at least one of a trailer service brake system and a trailer parking brake system.

3. A vehicular brake response analysis system as claimed in claim 2:

wherein the test methodology includes a service brake application and release timing test;

wherein the test start sensor is at least one of a test rig switch and a brake pedal switch;

wherein the brake pedal switch is coupled to a vehicular brake pedal, a pressure sensor is located at each vehicular service brake chamber; and wherein the service brake application timing test measures a time period elapsed between an operator applying brake pressure, given a predetermined brake application start pressure in the service brake chambers, and the increase of braking pressure to a predetermined brake application pressure at the service brake chambers, and wherein the service brake release timing test measures a time period elapsed between the operator releasing brake pressure, given a predetermined brake release start pressure in the service brake chambers, and the reduction of braking pressure to a predetermined brake release pressure at the service brake chambers.

4. A vehicular brake response analysis system as claimed in claim 2:
   wherein the test methodology includes a parking brake timing test;
   wherein the test start sensor is at least one of a pressure transducer which is located at a supply air port on a vehicular parking brake control valve and a pressure transducer which is located within the air line which couples the trailer test rig to the trailer parking brake system;
   wherein a pressure sensor is located at each vehicular parking brake chamber; and
   wherein given a predetermined initial supply air pressure, parking brake timing is the time elapsed between the operator activating the test start sensor by releasing the air from the system and the reduction of braking pressure to a predetermined parking brake application pressure at the parking brake chambers.

5. A vehicular brake response analysis system as claimed in claim 2.
   wherein the test methodology includes a brake scan test;
   wherein the test start sensor is at least one of a pressure sensor, a brake switch which is coupled to a vehicular brake pedal, a trailer test rig switch, and a key on the user interface;
   wherein at least one pressure sensor is located within at least one monitoring point within a vehicular brake system; and
   wherein the brake scan test measures braking pressure within at least one monitoring point.

6. A vehicular brake response analysis system as claimed in claim 1:
   wherein the test methodology includes a dynamic balance test;
   wherein the start sensor is a pressure transducer located at a vehicular service air gladhand fitting;
   wherein at least one pressure sensor is located at a first service brake chamber and at least one pressure sensor is located at a second service brake chamber; and
   wherein, given a predetermined initial service air brake application pressure and a predetermined initial service air brake release pressure, the dynamic balance test measures service brake chamber pressures during brake application and release.

7. A vehicular brake response analysis system as claimed in claim 1:
   wherein the test methodology includes a static balance test;
   wherein the start sensor is a pressure transducer located at a vehicular service air gladhand fitting;
   wherein at least one pressure sensor is located at a first service brake chamber and at least one pressure sensor is located at a second service brake chamber; and
   wherein, given a predetermined initial service air brake application pressure, a predetermined initial service air brake release pressure, and a plurality of predetermined target step values, the static balance test measures service brake chamber pressure at each target step value during service brake application and release.

8. A vehicular brake response analysis system as claimed in claim 1,
   wherein the test methodology includes a brake threshold test;
   wherein the test start sensor is a key on the user interface;
   wherein the pressure sensor is located at a vehicular service brake chamber on a wheel; and
   wherein the brake threshold test measures brake chamber pressure required to make and release contact between a brake lining and a brake drum during manual rotation of the wheel.

9. A vehicular brake response analysis system as claimed in claim 1, wherein the pressure sensor is a pressure transducer.

10. A method for analyzing vehicular brake system response comprising:
    selecting a test methodology;
    commencing the selected test methodology;
    activating a test start sensor to generate a test start signal for a stationary vehicle;
    sensing pressure with at least one pressure sensor located within at least one monitoring point of a vehicular brake system and providing at least one pressure signal indicative thereof;
    receiving the test start and pressure signals and processing same according to predetermined logic rules to determine if the performance of the vehicular brake system of the stationary vehicle is within predetermined acceptable standards; and
    outputting the test start and pressure signals in graphical and numerical form to a user interface.

11. A method for analyzing vehicular brake system response as claimed in claim 10, further comprising:
    generating brake application and release test pressure for at least one of a trailer service brake system and a trailer parking brake system by activating a test rig switch on a trailer test rig; and
    coupling at least one of a trailer service brake system and a trailer parking brake system to the trailer test rig with an air line.

12. A method for analyzing vehicular brake system response as claimed in claim 11:
    wherein the test methodology includes a service brake application and release timing test;
    wherein the test start sensor is at least one of a test rig switch and a brake pedal switch;
    wherein the brake pedal switch is coupled to a vehicular brake pedal;
    wherein a pressure sensor is located at each vehicular service brake chamber;
    wherein the service brake application timing test measures a time period elapsed between an operator applying brake pressure, given a predetermined brake application start pressure in the service brake chambers, and the increase of braking pressure to a predetermined brake application pressure at the service brake chambers; and
    wherein the service brake release timing test measures a time period elapsed between the operator releasing brake pressure, given a predetermined brake release start pressure in the service brake chambers, and the reduction of braking pressure to a predetermined brake release pressure at the service brake chambers.

13. A method for analyzing vehicular brake system response as claimed in claim 11:
    wherein the test methodology includes a parking brake timing test;

wherein the test start sensor is at least one of a pressure transducer which is located at a supply air port on a vehicular parking brake control valve and a pressure transducer which is located within the air line which couples the trailer test rig to the trailer parking brake system;

wherein a pressure sensor is located at each vehicular parking brake chamber; and wherein given a predetermined initial supply air pressure, parking brake timing is the time elapsed between the operator activating the test start sensor by releasing the air from the system and the reduction of braking pressure to a predetermined parking brake application pressure at the parking brake chambers.

14. A method for analyzing vehicular brake system response as claimed in claim 11.

wherein the test methodology includes a brake scan test;

wherein the test start sensor is at least one of a pressure sensor, a brake switch which is coupled to a vehicular brake pedal, trailer test rig switch, and a key on the user interface;

wherein at least one pressure sensor if located within at least on monitoring point within a vehicular brake system; and wherein the brake scan test measures braking pressure within at least one monitoring point.

15. A method for analyzing vehicular brake system response as claimed in claim 10:

wherein the test methodology includes a dynamic balance test;

wherein the start sensor is a pressure transducer located at a vehicular service air gladhand fitting;

wherein at least one pressure sensor is located at a first service brake chamber and at least one pressure sensor is located at a second service brake chamber; and wherein, given a predetermined initial service air brake application pressure and a predetermined initial service air brake release pressure, the dynamic balance test measures service brake chamber pressures during brake application and release.

16. A method for analyzing vehicular brake system response as claimed in claim 10:

wherein the test methodology includes a static balance test;

wherein the start sensor is a pressure transducer located at a vehicular service air gladhand fitting;

wherein at least one pressure sensor is located at a first service brake chamber and at least one pressure sensor is located at a second service brake chamber; and wherein, given a predetermined initial service air brake application pressure, a predetermined initial service air brake release pressure, and a plurality of predetermined target step values, the static balance test measures service brake chamber pressure at each target step value during service brake application and release.

17. A method for analyzing vehicular brake system response as claimed in claim 10:

wherein the test methodology includes a brake threshold test;

wherein the test start sensor is a key on the user interface;

wherein the pressure sensor is located at a vehicular service brake chamber on a wheel; and wherein the brake threshold test measures brake chamber pressure required to make and release contact between a brake lining and a brake drum during manual rotation of the wheel.

18. A method for analyzing vehicular brake system response as claimed in claim 10, wherein the pressure sensor is a pressure transducer.

19. A vehicular brake response analysis system comprising:

means for selecting a test methodology;

means for commencing the selected test methodology, means for activating a test start sensor to generate a test start signal on a stationary vehicle;

means for sensing pressure with at least one pressure sensor located within at least one monitoring point of a vehicular brake system and providing at least one pressure signal indicative thereof;

means for receiving the test start and pressure signals and processing same according to predetermined logic rules to determine if the performance of the vehicular brake system of the stationary vehicle is within predetermined acceptable standards; and means for outputting the test start and pressure signals in graphical and numerical form to a user interface.

20. A vehicular brake response analysis system comprising:

an electronic control unit incorporated into a personal computer;

a test start sensor electrically communicating with the electronic control unit for sensing commencement of a test time period and providing a test start signal indicating the commencement of the test time period; and at least one pressure sensor electrically coupled to the electronic control unit, located within at least one monitoring point within a vehicular brake system, and providing at least one pressure signal indicative thereof, the electronic control unit receiving the test start and pressure signals, processing the signals according to a test methodology for determining if the performance of the vehicular brake system is within predetermined acceptable standards.

21. The vehicular brake response analysis system as set forth in claim 20 further comprising:

a user interface incorporated into the electronic control unit, the user interface displaying at least one pressure signal in at least one of a graphical format and a numerical format.

22. A vehicular brake response analysis system comprising:

an electronic control unit incorporated into a personal computer;

means for detecting movement of a vehicle brake pedal, which indicates commencement of a test time period, and providing a test start signal indicating the commencement of the test time period; and at least one pressure sensor electrically coupled to the electronic control unit, located within at least one monitoring point within a vehicular brake system, and providing at least one pressure signal indicative thereof, the electronic control unit receiving the test start and pressure signals, processing the signals according to a test methodology for determining if the performance of the vehicular brake system is within predetermined acceptable standards.

23. The vehicular brake response analysis system as set forth in claim 22 wherein the means for detecting is a switch.

* * * * *

UNITED STATES PATENT AND TRADEMARK OFFICE
CERTIFICATE OF CORRECTION

PATENT NO. : 6,754,568 B1
DATED : June 22, 2004
INVENTOR(S) : John V. Ripley

It is certified that error appears in the above-identified patent and that said Letters Patent is hereby corrected as shown below:

Column 8,
Line 60, please delete "To"

Column 13,
Line 22, please delete "if" and insert -- is --
Line 23, please delete "on" and insert -- one --

Signed and Sealed this

Twelfth Day of October, 2004

JON W. DUDAS
*Director of the United States Patent and Trademark Office*